3,221,194
PERMANENT MAGNET ROTOR
Alan B. Blackburn, Troy, Ohio, assignor to General Motors Corporation, Detroit, Mich., a corporation of Delaware
Filed Jan. 24, 1962, Ser. No. 168,380
4 Claims. (Cl. 310—156)

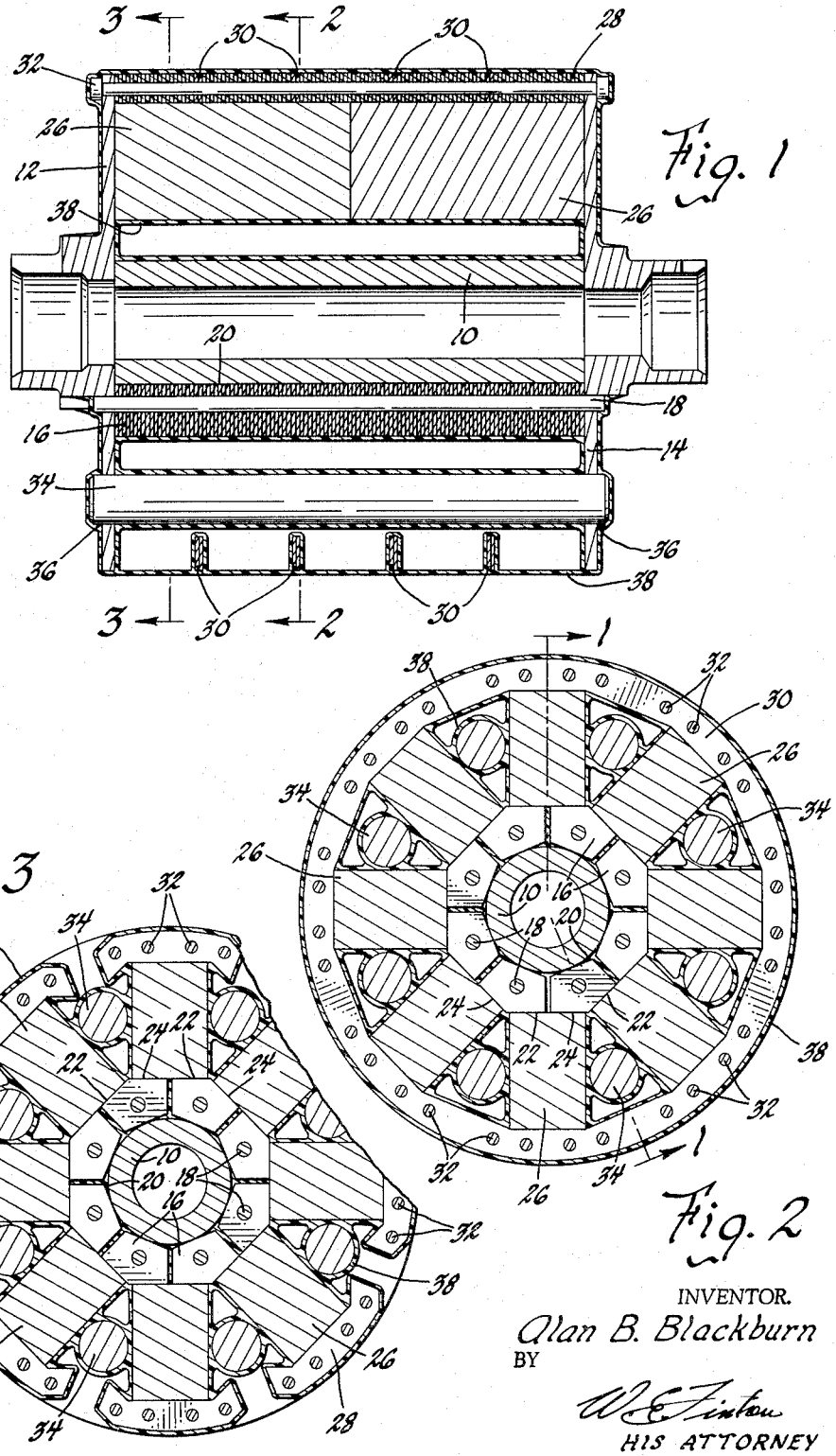

This invention pertains to dynamoelectric machines, and particularly to an improved and highly efficient multi-polar permanent magnet rotor.

Heretofore, numerous multi-polar permanent manget rotors have been designed and built which embody a plurality of permanently magnetized bar magnets which are held in assembled relation between a core, or hub, and a hoop assembly. The present invention is directed particularly to a more efficient magnetic design for rotors of this type having more than four poles. Accordingly, among my objects are the provision of a permanent magnet rotor assembly including a plurality of bar-type permanent magnets which are retained in a radial direction by circumferential support rings; the further provision of a permanent magnet rotor assembly of the aforesaid type including laminated pole pieces and laminated keepers, or couplers; the further provision of a permanent magnet rotor assembly including longitudinally extending bar-type damper means; and the still further provision of a permanent magnet rotor assembly wherein the bar-type magnets and keepers are loosely assembled prior to magnetization, and thereafter held in assembled relation by a plastic coating.

The aforementioned and other objects are accomplished in the present invention by arranging the bar-type permanent magnets between circumferential support rings and laminated keepers, both the magnets and keepers having a substantial degree of freedom prior to magnetization so as to facilitate completion of magnetic paths during magnetization. Specifically, each bar magnet includes a laminated pole piece which is supported between adjacent laminated support rings, the rings and pole pieces being riveted together. The keepers are initially located by longitudinally extending pins between the two end plates, and a plurality of low resistance copper bars extend longitudinally between the bar-type magnets for completing a damper circuit. After magnetization, the rotor is dipped in polyurethane which, upon setting, provides a rigid structure.

Further objects and advantages of the present invention will be apparent from the following description, reference being had to the accompanying drawing, wherein a preferred embodiment of the present invention is clearly shown.

In the drawing:

FIGURE 1 is a longitudinal sectional view of the improved rotor assembly taken along line 1—1 of FIGURE 2.

FIGURE 2 is a sectional view taken along line 2—2 of FIGURE 1.

FIGURE 3 is a fragmentary sectional view taken along line 3—3 of FIGURE 1.

With reference to the drawing, the improved rotor assembly includes a centrally located tubular core 10, circular in cross section, and which is held in assembled relation with a pair of end plates 12 and 14 having integral hubs adapted to support bars on their outer peripheries. A through shaft, not shown, is designed to drive the rotor and is thus suitably attached to the hubs in any well known manner.

A plurality of polyhedral laminated keepers, or magnetic couplers, 16 are loosely mounted about the periphery of the core 10. These keepers 16 are loosely located by longitudinally, or axially, extending pins 18 between the nonmagnetic end plates 12 and 14. It can be seen that each polyhedral keeper has an inner flat side 20 tangentially arranged with the periphery of the core 10, and a pair of angularly related flat faces 22 and 24 opposite thereto. The flat faces 22 and 24 are adapted to engage the inner ends of adjacent bar-type permanent magnets 26 which, as seen in FIGURE 1, are composed of two pieces in the axial direction. The permanent magnets 26 are assembled so that the outer circumferentially spaced ends have poles of opposite magnetic polarity. The outer end of each radially arranged bar-type magnet is engaged by a laminated pole piece 28. The laminated pole pieces are arranged in axially spaced groups between which circumferentially laminated support rings 30 are disposed. Four sets of laminated support rings are used in the assembly as shown in FIGURE 1. The laminated pole pieces 28 and the laminated support rings 30 are maintained in assembled relation by axially extending rivets 32 which, as seen in FIGURE 1, extend from one end plate 12 through the laminated parts to the other end plate 14. The support rings 30 are nonmagnetic and have low permeability. Preferably, although not necessarily, these support rings are composed of stainless steel which has good tensile strength, and the magnetic properties of which can be controlled by specifying the hardness range.

In order to limit the demagnetizing effects of transient short circuits, a copper bar 34 is arranged between each pair of bar magnets 26. These copper bars, completing a damper circuit, have their ends swaged at 36 to the end plates 12 and 14 and also soldered thereto.

After the rotors are assembled with the parts described hereinbefore, both the bar-type magnets 26 and the keepers 16 have a substantial degree of freedom. Thereafter the rotor is magnetized, and after magnetization the entire rotor is dipped in a suitable plastic 38, such as polyurethane, which, upon setting, retains the parts in assembled relation as a rigid structure thereby precluding relative movement between the keepers and the magnets and between this assembly and the core 10.

While the embodiment of the invention as herein disclosed constitutes a preferred form, it is to be understood that other forms might be adopted.

What is claimed is as follows:

1. A permanent magnet rotor assembly including, a central core, a plurality of polyhedral laminated keepers arranged circumferentially of and mounted on said core and extending radially therefrom, each keeper having two angularly oriented outer faces, a plurality of bar magnets arranged circumferentially and extending radially of said keepers, the inner end of each bar magnet engaging one face of a pair of adjacent keepers, a plurality of pole pieces for the outer ends of said bar magnets, a plurality of axially spaced nonmagnetic support rings attached to said pole pieces, and a pair of end plates attached to said pole pieces and said support rings each keeper being loosely located between said end plates prior to magnetization by a pin extending axially between said end plates.

2. A permanent magnet rotor assembly including, a central core circular in cross section, a plurality of polyhedral laminated keepers arranged circumferentially of and mounted on said core and extending radially therefrom, a pair of end plates, means extending axially between said end plates and through said keepers for loosely locating the keepers therebetween prior to magnetization, a plurality of bar magnets arranged circumferentially of said keepers and extending radially therefrom with the inner ends engaging said keepers, a plurality of pole pieces for the outer ends of said bar magnets, and a plurality of axially spaced nonmagnetic support rings attached to said pole pieces and said end plates.

3. The rotor assembly set forth in claim 2 including a plastic coating encapsulating the several parts after magnetization to provide a rigid assembly.

4. A permanent magnet rotor assembly including, a central core, a plurality of magnetic keepers arranged circumferentially of and mounted on said core and extending radially therefrom, a plurality of bar magnets arranged circumferentially of said keepers and extending radially therefrom, pole pieces for the outer ends of said bar magnets, a plurality of circumferentially arranged, axially spaced nonmagnetic support rings attached to said pole pieces, a pair of end plates attached to said pole pieces and said support rings, each keeper being loosely located between said end plates prior to magnetization by a pin extending axially between said end plates, and a plurality of copper bars extending axially of said rotor assembly and disposed between said permanent magnets for completing the damper circuit, said bars being electrically connected to said end plates.

References Cited by the Examiner
UNITED STATES PATENTS

| | | | |
|---|---|---|---|
| 2,192,985 | 3/1940 | Reis | 310—156 |
| 2,493,102 | 1/1950 | Brainard | 310—156 |
| 2,522,233 | 9/1950 | Merrill | 310—156 |
| 2,660,865 | 12/1953 | Durant | 310—156 X |
| 2,680,822 | 6/1954 | Brainard | 310—156 X |
| 2,877,366 | 3/1959 | Carr | 310—156 |

ORIS L. RADER, *Primary Examiner.*

DAVID X. SLINEY, *Examiner.*